(12) United States Patent
Huyer et al.

(10) Patent No.: US 6,424,923 B1
(45) Date of Patent: Jul. 23, 2002

(54) METHOD FOR COMPUTING THREE DIMENSIONAL UNSTEADY FLOWS BY SOLUTION OF THE VORTICITY EQUATION ON A LAGRANGIAN MESH

(75) Inventors: Stephen A. Huyer, Saunderstown; John R. Grant, Jamestown; James S. Uhlman, Newport, all of RI (US); Jeffrey S. Marshall, North Liberty, IA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 103 days.

(21) Appl. No.: 09/675,894

(22) Filed: Sep. 29, 2000

(51) Int. Cl.$^7$ ................................................. G01F 1/00
(52) U.S. Cl. ................... 702/45; 703/2; 703/8; 703/9; 137/804; 73/147; 73/195
(58) Field of Search ................... 73/147, 195; 137/804; 703/2, 8, 9; 702/45

(56) References Cited

U.S. PATENT DOCUMENTS

| | | | | | |
|---|---|---|---|---|---|
| 5,408,638 A | * | 4/1995 | Sagawa et al. | ................ | 703/2 |
| 5,544,524 A | * | 8/1996 | Huyer et al. | ................... | 73/147 |
| 5,600,060 A | * | 2/1997 | Grant | ........................... | 73/147 |
| 6,096,088 A | * | 8/2000 | Yu et al. | ........................ | 703/9 |

* cited by examiner

Primary Examiner—John S. Hilten
Assistant Examiner—Stephen J. Cherry
(74) Attorney, Agent, or Firm—Michael J. McGowan; James M. Kasischke; Prithvi C. Lall

(57) ABSTRACT

A method for computing three dimensional unsteady flows about an object. An allowable error is established for the vorticity term calculations, and object geometry is provided giving surface points on an object and a region of interest. A mesh is established incorporating points on the object. Initial flow conditions are set at the surface. Vorticity values that will satisfy boundary conditions are set at the provided surface points. A new mesh is established incorporating the provided points and other points in the region of interest. Boxes are generated containing the provided points and other points. Velocities and pressures at each point are calculated from the flow conditions, vorticity values and boundary conditions., A time variable is incremented and each point is moved by applying the calculated velocity. Vorticity at each point is then recalculated. The method is iterated starting with the step of satisfying boundary conditions until the incremented time variable exceeds a predetermined value.

8 Claims, 4 Drawing Sheets

METHOD FOR COMPUTING THREE DIMENSIONAL UNSTEADY FLOWS BY SOLUTION OF THE VORTICITY EQUATION ON A LAGRANGIAN MESH satisfying boundary conditions until the incremented time variable exceeds a predetermined value.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to the analysis of fluid flow past a three dimensional object and more particularly to a method and apparatus for calculating three-dimensional unsteady flows past such an object by direct solution of the vorticity equation on a Lagrangian mesh.

(2) Description of the Prior Art

Understanding the characteristics of fluid as it flows past an object, such as an airfoil, is important both from the standpoint of understanding and improving the designs of such objects and in understanding the nature of any turbulence introduced as a result of relative motion of a fluid an airfoil, either by moving of the airfoil through the fluid or by moving the fluid past the airfoil.

Eventually additional studies determined that vorticity was useful as a basis for understanding fluid flow. Vorticity is produced at a solid boundary because at the surface the fluid has no velocity (i.e., the fluid exhibits a no slip condition). Once generated at the surface, vorticity diffuses into the volume of the fluid where it is advected by local flow. Conventional vortex methods generally mime this process. In accordance with such methods, the strengths of the vortex elements or segments originating on the body surface are determined by requiring that the velocity induced by all the vortex elements on the surface be equal and opposite to the velocity at the surface. It is assumed that this vorticity is contained in an infinitely thin sheet at the surface. In these methods a resulting matrix equation is solved for the surface vorticity at all points on the body simultaneously. Vorticity transfer to the flow is then accomplished by placing the vortex elements above the surface.

It has been recognized that these vortex methods have several shortcomings. When computational methods use point vortices in their simulations, mathematical singularities can produce divergent solutions. This has been overcome by using a kernel function that contains a regularized singularity. However, this kernel function depends on certain ad hoc assumptions such as the value of the cutoff velocity and core radius. While the no-slip and no-flow boundary conditions provide information regarding the strength of the surface vorticity and subsequent strength of the vortex element, their use often neglects the effects of all other vortex sheets on the surface. Other implementations of such methods neglect the effects of coupling between the surface vortex sheets and surface sources. Finally, many methods assume, a priori, a separation point to analyze shedding of vorticity from the surface into the flow that generally requires experimental knowledge of the flow. More recent prior art has utilized computer modeling based upon the nature of vortex elements at the surface of an object, such as an airfoil. These models then track the motion of each element as it moves into the flow over time to calculate the velocity of each element. While this prior art produces acceptable results, the direct calculation of the velocity of each vortex element produces an $N^2$ increase in the required time for processing where N is the number of vortex elements for each time step. Such increases can become unacceptable when high resolution demands the calculation of a large number of vortex elements.

The evolution of fluid flow of uniform density is prescribed by the vortcity equation $$\frac{\partial \omega}{\partial t} + u \cdot \nabla \omega = \omega \cdot \nabla u + \nu \nabla^2 \omega \tag{1}$$

where $\nu$ is the kinematic viscosity and the velocity u and vorticity $\omega$ are related by $$\nabla = u = \omega \tag{2}$$

Since the density is taken to be uniform, the equation for conservation of mass reduces to the condition on the velocity field $$\nabla \cdot u = 0 \tag{3}$$

At the no-slip surface of a body immersed in the fluid and moving with velocity $U_{body}$, the velocity of the fluid satisfies the boundary condition $$u = u_{body} \tag{4}$$

on the body surface. In this frame of reference, the velocity of the fluid at infinity is typically taken to be zero. The vorticity boundary condition at the body surface is established by requiring the satisfaction of (4), as described below. When the pressure distribution on the body surface is desired, it is found by solution of the matrix equation stemming from the integral form of the pressure Poisson equation (Uhlman, 1992)

$$\beta B + \oiint_S B \frac{\partial}{\partial n}\left(\frac{1}{r}\right) dS = \tag{5}$$

$$-\oiint_S \left(\frac{n}{r} \cdot \frac{\partial u}{\partial t} + \frac{\nu r \cdot n \times \omega}{r^3}\right) dS + \iiint_V \frac{r \cdot u \times \omega}{r^3} dV$$

where B is defined as $$B = \frac{p - p_\infty}{\rho} + \frac{1}{2}(u \cdot u - U_\infty \cdot U_\infty) \tag{6}$$

and $$\hat{a} = \begin{cases} 4\partial \to V \\ 2\partial \to S \\ 0 \to V^c \end{cases} \tag{7}$$

with V defined as the volume exterior to the body whose surface is S, and Vc is the complement of V. The matrix equation has as its unknown B on the surface; for pressure in the interior of the flow, the surface integral on the left-hand side of (5) is known from the matrix solution.

To determine the velocity field associated with the instantaneous vorticity field calculated by solution of (1) and thus advance the solution in time, we employ the vector identity for a sufficiently integrable and differentiable vector field a defined within a volume V bounded by a surface S with normal unit vector n:

$$\beta a = \qquad (8)$$
$$-\oiint_S ((n \cdot a)G - G \times (n \times a))dS + \iiint_V ((\nabla \cdot a)G - G \times (\nabla \times a))dV$$

with β as given above, and G is any vector Green' function of the form $$G = \frac{r}{r^3} + H(r) \qquad (9)$$

Here r is the vector from integration element to field point, and H is regular. When a is the velocity u, after substituting (2) and (3) into (6) and taking H to be zero, we have the familiar Biot-Savart integral $$u(x) = \frac{1}{4\pi} \iiint_V \frac{\hat{u} \times (x - x')}{|x - x'|^3} d^3 x' \qquad (10)$$

plus surface terms depending on the particular application.

This integral is to be computed given the solution ω ($x_m$) on the calculational points $x_m$, m=1, 2, . . . , N, where N is the number of points. An important feature of (6) is that the farfield boundary condition on velocity is explicit, so that computational points are needed only where ω is nonzero. An approach to the velocity calculation based on an inversion of the Poisson equation for velocity would require a volume of calculational points extending to where the farfield velocity can be accurately approximated by an analytic expression.

The vortex blob method is an effective way to carry out integration on scattered points, and is quite useful for many unbounded flow investigations; however it has some drawbacks for flow past surfaces. The principal limitation stems from the blob geometry. Flow near a surface is well known to be anisotropic in scale, strongly so at high Reynolds numbers. Resolution of the vorticity field in such flows demands a large number of blobs. Additionally, anisotropic blobs to have limited utility in computing flow past an object because it is difficult to maintain overlap to properly resolve the flow. In addition, regions near the object surface can arise where the anisotropy is complicated, such as in separated flow.

A recent prior art innovation some of these computational methods was taught in U.S. Pat. No. 5,544,524 filed by Grant, Huyer and Uhlman which is incorporated by reference herein. This prior art teaches the use of disjoint elements of compact support in the form of rectangles to describe the vorticity field. These anisotropic elements are created at the surface with the strength determined by the no-slip and no-flux boundary conditions. In this method, the vorticity is taken as uniform over the entire element and the endpoints of the element are advected independently with the area of the element conserved and, therefore, the total circulation.

This technique was applied to an airfoil undergoing both single pitch and oscillatory pitching motions to produce large scale vortex structures. In the former case, calculations of the unsteady flow and unsteady lift and drag forces obtained from surface pressure integrations were in excellent agreement with experimental results. In the case of the oscillating airfoil, however, poor agreement was found as the flow field dynamically reattached. The most likely reason is the use of random walk to model diffusive effects. Use of this algorithm is required because disjoint elements are not connected to one another.

Huyer et al., U.S. Pat. No. 5,600,060, teach calculation of fluid flow characteristics directly from a two dimensional surface model of the object. A plurality of surface nodes with defined boundary conditions are established on the surface model. Consecutive layers of nodes are created a preset distance outward from said surface model. Curved panels are defined passing through three nodes at a layer, and a surface shape function is established for each panel from previous panels or from the boundary conditions. The fluid flow velocity for the next layer is developed from the velocities calculated at the previous layer and the shape function. Triangular elements are created by connecting a node on the next layer with two nodes from the previous layer to form an element. First and second vorticity gradients can be calculated for the current node at a time segment from the parameters associated with the previous layer of interest nodes at that time increment. This can be combined with the calculated diffusion velocity for the node to produce a rate of change of vorticity with respect to time which can be used to calculate the velocity of the fluid at the node.

None of these methods provide an efficient method for calculating unsteady flows around a three-dimensional object using Lagrangian meshes.

SUMMARY OF THE INVENTION

Therefore, it is an object of this invention to provide an improved method and apparatus for predicting the flow of fluid past a three dimensional object that minimizes the assumptions used in the predictions.

It is a further object that such improved method be computationally efficient for a given accuracy in order to allow calculation in a reasonable amount of computing time.

Accordingly, this invention provides a method for computing three dimensional unsteady flows about an object. An allowable error is established for the vorticity term calculations, and object geometry is provided giving surface points on an object and a region of interest. A mesh is established incorporating points on the object. Initial flow conditions are set at the surface. Vorticity values that will satisfy boundary conditions are set at the provided surface points. A new mesh is established incorporating the provided points and other points in the region of interest. Boxes are generated containing the provided points and other points. Velocities and pressures at each point are calculated from the flow conditions, vorticity values and boundary conditions. A time variable is incremented and each point is moved by applying the calculated velocity. Vorticity at each point is then recalculated. The method is iterated starting with the step of satisfying boundary conditions until the incremented time variable exceeds a predetermined value.

In accordance with a method and apparatus of this invention fluid flow characteristics are calculated from a three dimensional surface model of the object.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
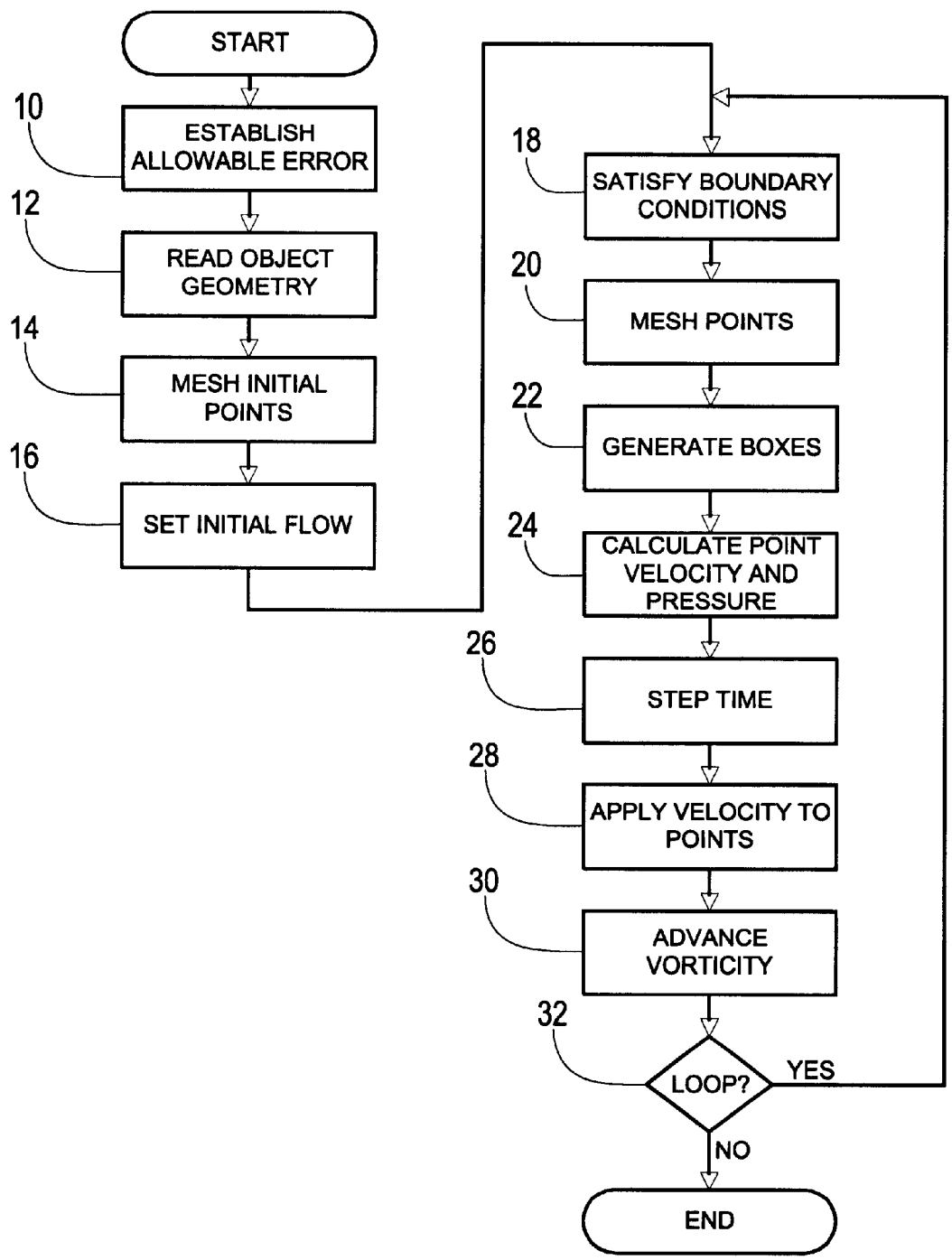
FIG. 1 is a general flowchart of the current invention.

FIG. 1 provides an overview of the current invention. In order to initialize the computer processing algorithm, data concerning the allowable error and the object geometry must be provided to the computer. The allowable error terms provided in step 10 are necessary for establishing the number of terms in the calculation. The object geometry provided in step 12 is necessary to set up the initial conditions for the calculation. After the computer reads initialized data from steps 10 and 12, initial points are placed in a mesh, 14, generated using a mesh construction algorithm discussed below. Initial flow conditions are provided 16.

The algorithm then proceeds to calculate new point locations for each step in time. First, in step 18 the points near the object are given values to satisfy the boundary conditions at-the surface of the object. The points are then placed in meshes 20 using the mesh construction algorithm below. Boxes are generated about a number of points 22 using the box construction algorithm discussed below. In step 24, point velocities and optionally pressure are calculated from the vorticities of the surrounding points. The time step is incremented in step 26, and in step 28, points are moved to new positions based on the velocities calculated in step 24. New vorticities are calculated 30. The algorithm then loops back at step 32 to step 18 to continue. This results in the points being meshed twice, but meshing is relatively fast and this provides a convenient method of setting up the loop for the initial flow. This part of the algorithm continues looping back at step 32 until the period of interest has elapsed.

Figure 2:
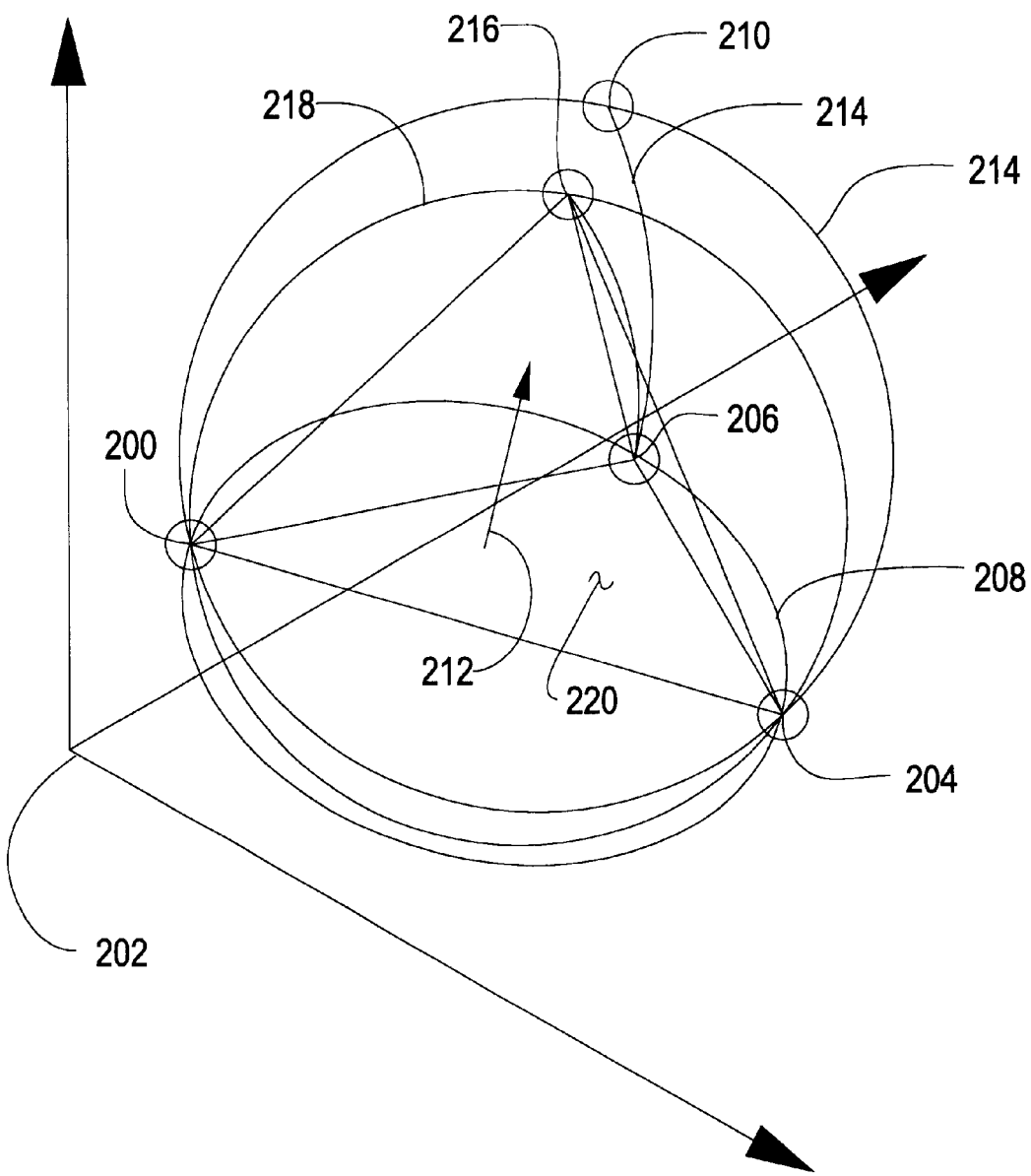
FIG. 2 is a diagram illustrating steps of the point meshing algorithm.

FIG. 2 provides a diagram of the point meshing algorithm showing the points chosen. In order to form a single tetrahedral element, a first point 200 is chosen closest to an origin 202. A second point 204 is chosen closest to the first point 200, and then a third point 206 is chosen to minimize the radius of the circle 208 including all three points. A random point 210 is then chosen in a positive normal direction 212 to the plane containing the three points. Next, the algorithm constructs a sphere 214 from points 200, 204, 206 and 210. Nearby points are searched with relation to sphere 214. Nearby points can be defined as those points that are within the local box or adjacent boxes or as those points that are within a predetermined radius of the other selected points. If a nearby point 216 lies within sphere 214, it replaces the random point 210 and a new sphere 218 is constructed. After replacement, nearby points are again searched until all nearby points have been searched.

Once the first tetrahedron 220 has been constructed, its sides can serve as the first three points for other tetrahedrons. As above another random point is chosen[]in a positive normal direction to the plane formed by the side of the original tetrahedron 220. The sphere formed by the four points is tested against nearby unincorporated points and incorporated if no other point falls within the sphere. New tetrahedra are established in this manner until all points are incorporated into tetrahedra.

Figure 3:
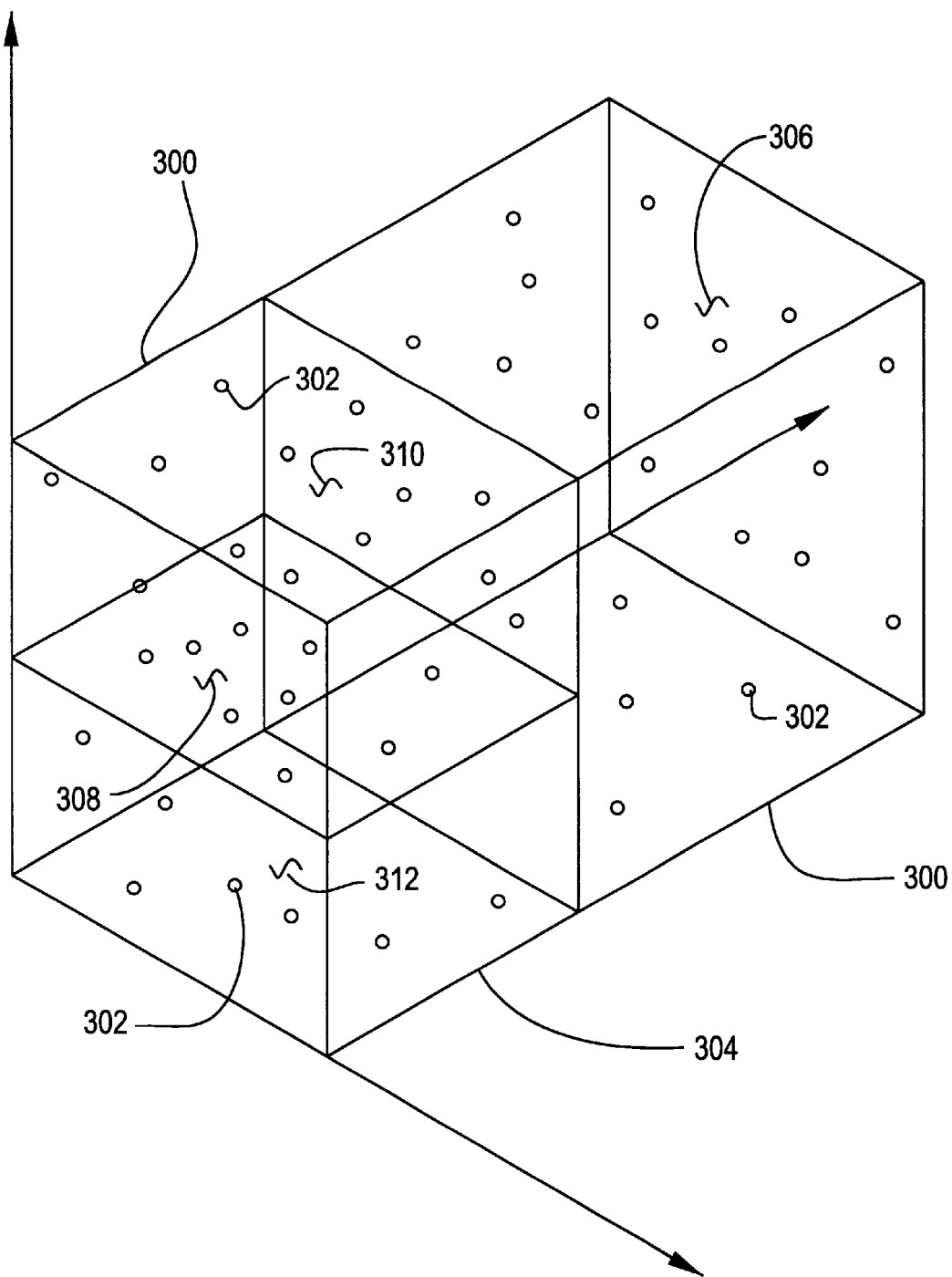
FIG. 3 is a diagram illustrating the box generation algorithm.

FIG. 3 is a diagram showing the box construction algorithm discussed as step 22 above. The total number of points and boxes is calculated from the allowable error provided upon initialization. This calculation should give the minimum number of points for each box. As a further example, box 308 is shown divided into box 310 and box 312.

An initial box 300 is formed around all the points of interest 302. The initial box 300 is then divided along its longest dimension 304 into two new boxes 306 and 308 each having substantially the same number of points 302 therein. Boxes having an odd number of points therein will be subdivided into two boxes having a number of points differing by one instead of an equal number of points. These boxes 306 and 308 are then subdivided in the same manner as above until,each resulting box has approximately the calculated minimum number of points therein.

In step 24 of FIG. 1, calculation of point velocities is performed by a selected method depending on the resulting error. The net effect of this is that the contribution to velocity of the points outside the local box is performed using the Gaussian quadrature one point rule, the contribution of tetrahedrons inside the local box is performed using the Gaussian quadrature five point rule, and the contributions of tetrahedrons bordering the local tetrahedron are performed using analytic integration. These calculations are then combined to obtain the velocity at the current point. These steps are carried out for each point.

Contributions from more distant points are performed by using the integral over the boxes calculated by multipole expansion. The integration is carried out in terms of the tetrahedra in each box, so that moments in the multipole expansion for a box are computed by integration over each tetrahedron in the box. The memory requirement for the relation of the tetrahedra to the box structure is minimized by the use of a linked list.

In order to calculate terms near the current point, i.e. in tetrahedrons bordering the local tetrahedron, the vorticity over a tetrahedron is taken to be the average of that at the four nodes and taken out of the integral of equation (10). The following technique is taught by Grant et al., *Solution of the Vorticity Equation on a Lagrangian Mesh Using Triangularization*: Computation of the Biot-Savart Integral in Three Dimensions, Forum on Vortex Methods for Engineering Applications Papers, Sandia National Laboratory, Albuquerque, NM, (February 1995). The resulting volume integral is converted by integration by parts to a surface integral over the triangular faces of the tetrahedra. These four integrals are computed using expressions provided in Newman, Distributions of Sources and Normal Dipoles Over a Quadrilateral Panel, 20 *J. Engineering Math.* 113–26 (1986).

In order to compute the velocity and pressure as in step 24 one must first compute the velocity gradient tensor and the Laplacian and thus advance the solution of (1), a moving least-squares method algorithm is employed. Several algorithms for calculation of the Laplacian of a vector field on scattered points are known in the art; however, in order to take full advantage of the Lagrangian aspects of the approach, calculational techniques depending on interpolation to a grid have been avoided. It is also desirable that the approach not require a point density depending on the diffusion term, since in high Reynolds number flows diffusion is paramount only in limited regions of the flow. The moving least squares method enables computation of the velocity gradient tensor and the Laplacian with the same algorithm, and is directly adaptable to turbulence modeling.

Utilizing the moving least-squares method, a quadratic polynomial is fit on the neighbors about each point to give the values of the field variable to be differentiated. The constant term in the polynomial is taken to be the value of the field variable at the point in question, and the coefficients multiplying the nine (in three dimensions) terms of the polynomial must be specified by this fit. Nine equations are obtained by minimizing the sum over the neighbor points of the square of the difference between the polynomial and the variable. These constants and thus the first and second derivatives of the polynomial are found by solution of the 9×9 set at each point. The field variable derivatives are taken to be those of the polynomial. This algorithm is known in applications where derivatives are desired for information provided on scattered points.

Several issues must be taken into account. When applied to a regular grid of points, computation of the full polynomial, including the cross terms, there are 26 neighbors of each point. This number, 26, thus is a scale for the number of neighbors needed in forming the sums for this fit. If the number of neighbors included in the sum is much below that, the 9×9 matrix is ill-conditioned. Even if the number of neighbors is sufficient, the points might be arranged so that again the matrix is ill-conditioned (a distribution nearly along a straight line is an example). To account for these special cases, the lower-upper decomposition solution strategy used for most points has been supplemented with a singular value decomposition algorithm as taught by Press, et al, Numerical Recipes, Cambridge University Press, New York (1992), if the condition number of the original matrix is high.

Another issue arises through the effect of the irregular spacing on the fit. Irregular spacing enters the value of the polynomial coefficients due to a higher polynomial power variation in the field that is being fit than that used for the fit. Thus, the moving least-squares method may be said to be 'second-order' in that the derivatives of a quadratic polynomial are computed exactly (to machine accuracy) on irregularly spaced points. But, for polynomials of higher order, the error in the computed derivatives decreases with decreasing average separation at a power slightly less than 2. For the Laplacian of a Gaussian (containing derivatives of unlimited order) computed on points placed randomly in a sphere, the $L_2$ error decreases approximately as $D^{1.4}$, where D is the average point spacing. This effect of irregular spacing on the fit precludes the repeated application of a linear fit to produce higher derivatives.

The triangulation of the points done for the Biot-Savart integration immediately gives the list of neighbors needed for this fit, so this approach to differentiation works well with the above for integration. However, this approach can also be used with an independent scheme for finding neighbors.

The accuracy produced by solution of the diffusion equation is a weak test of the accuracy of a Laplacian calculation. Apparently, the diffusion equation is, within limits, self-correcting.

The Laplacian of the vorticity field may be computed by the algorithm just described, and the result used in equation (1). However, as is advection, diffusion is a means of vorticity transport. For the usual Lagrangian method, the calculational points are transported by velocity alone, accounting for vorticity transport by advection. As long as points are provided wherever vorticity may diffuse, this is sufficient. However, unless 'empty' points are maintained in the neighboring irrotational flow, there will be no means by which diffusion can transport vorticity into the irrotational flow. An algorithmically effective strategy is to account for vorticity transport by diffusion by moving the calculational points with the sum of the fluid velocity and a diffusion velocity.

Diffusion velocity is taught by Truesdell, *The Kinematics of Vorticity*, Indiana University Press, Bloomington (1954), and elegant formulations may be made in terms of such velocities that conserve circulation or for that which vorticity behaves as a material element. Simple scalar diffusion velocity calculations are appropriate for this invention.

Thus, a diffusion velocity V based on the magnitude$\omega$ of the vorticity is given as:

$$v = -\nu \nabla (ln \omega) \quad (11)$$

To obtain the equation which describes the evolution of vorticity on points moving with the sum of u and v, $$v \cdot \nabla \omega \quad (12)$$

is added to both sides of (1):

$$\frac{\partial \omega}{\partial t} + (u+v) \cdot \nabla \omega = \omega \cdot \nabla u + \omega[\nu a \nabla^2 (ln \omega) + \nu \nabla^2 a - v \cdot \nabla a] \quad (13)$$

Here a is the unit vector tangent to the vorticity vector: $a = \omega / \omega$. The location of the calculational points is now given by $$\frac{dx}{dt} = u + v \quad (14)$$

Note that equation (13) is written with $ln(\omega)$ rather than$\omega$ appears under the Laplacian. The form shown minimizes the effects of errors in the calculation of the Laplacian, and it is much more stable than the alternative.

The computation of diffusion with the moving least-squares method is subject to a stability limitation on the size of the time step, similar to that for the explicit diffusion equation with centered finite-difference taught by Peyret et al., *Computational Methods for Fluid Flow*, Springer-Verlag, New York (1990). For fluid flows of interest, such a restriction often requires a time step much smaller than would otherwise be needed based on the other (inviscid) terms in (13) and (14). These inviscid terms are the advection and stretching terms. However, differentiation requires much less time than does integration to compute the velocity appearing in the inviscid terms. Consequently, a diffusion sub-step is embedded within the larger inviscid time steps. This strategy is particularly useful where boundary layers are involved. Typically, 5 to 10 sub-steps are taken per time step. The Adams-Bashforth second-order explicit time stepping is used for the stretching term in equation (13) and the advection term in equation (14), and a second-order predictor-corrector algorithm for the terms containing viscosity. All differentiations are carried out with the moving least-squares method.

The vorticity boundary condition is designed to continually force the tangential velocity at the body surface to zero. Consider the condition at a point m on the body surface. Let $A_m$ be one-third of the area of the triangular panels which intersect at node m, let $V_m$ be one-fourth of the volume of the tetrahedra which intersect at point m, and let n be the outward unit normal of the body surface at this point. For a (non-physical) slip velocity $u_m$ at this point, the total vorticity associated with this slip is $A_m n \times u_m$. A change in vorticity $\Delta v_m$ at node m and time t causes a change in the vorticity in the flow of $V_m \Delta v_m$. Additionally, the total amount of vorticity diffusing into the flow from the region of the body surface with area Am during the time interval (t, t+$\Delta$t) (where $\Delta$t is the time step) is given by $-n\, A_m\, \Delta t$ ($\partial v/\partial n$). Balancing the slip vorticity with the two volumetric vorticity terms gives $$A_m n \times u_m = V_m \Delta U_m - \nu A_m \Delta t (\partial \omega / \omega n)_m \quad (15)$$

The terms on the right-hand side involving vorticity may be written in terms of the vorticity at the nodes of the tetrahedra attached to point m. The result is a matrix equation involving the vorticity at point m and its neighbors. An iterative solution converges with a relative error of $10_{-4}$ in only three or four iterations.

The normal velocity at the surface would be effectively zero using this method, if there were no discretization error. In the current method, the normal velocity component must be driven to zero using a source panel method for this purpose. The K triangular panels on the surface are taken to have a source strength a uniform over each panel. The velocity at field point x due to these panels is $$u_s(x) = -\sum_{k=1}^{K} \frac{\alpha_k}{4\pi} \int\int_{\alpha_k} \frac{(x-x')}{|x-x'|^3} d^3 x' \quad (16)$$

where $\alpha_k$ is the area of the kth triangle. When this-term is added to the volume integral in (10) and the boundary condition (4) applied to the centroid of each panel, a K X K matrix equation results for the source strengths. An upper-lower decomposition solution is used to solve this matrix. The decomposition needs to be done only once, unless the relative position of the panels changes. This solution is obtained after the vorticity at the surface is set by solution of (15).

The requirement mentioned in the description of the moving least-squares method that the neighbors number at least 20 or so stems from the fact that accurate calculations are impossible when points are too sparsely spaced. Based on the integration routine, which assumes linear variation of vorticity within tetrahedra, points are added if the second-order terms in the Taylor series expansion of the vorticity within a tetrahedron becomes larger, relative to the sum of the zeroth and first-order terms, as a criterion. Use of 0.1 as a experimental criterion has been found to be successful.

A large vorticity gradient exists above a no-slip surface. Transport of the calculational points by the diffusion velocity as in equation (13) results in a streaming of the points away from the surface. This is, of course, a physically correct behavior, but, at the same time, it requires stringent measures to maintain sufficient point density in the vicinity of the surface. One solution to this difficulty is establishing a set of fixed points above those on the surface. These fixed points are staggered, and number 6 to 10 layers above the surface, each layer consisting of approximately the same number of points as those that define the surface. The outer layer height above the surface is determined by the diffusion length scale (a small integer multiple of this scale), so that this grid extends a very small distance into the flow, not compromising the stated goal of making full use of the advantages associated with Lagrangian points. Points still stream away from the upper layer of this grid to be replaced as described above, but the diffusion velocity is less and the diffusion in the near vicinity of the surface is better controlled.

It is well known that a direct calculation of the velocity at each point in the field using (10) requires a number of operations that is proportional to the square of the number N of calculational points, and that the associated computational time prohibits calculations requiring more than a few thousand points. The above algorithm reduces the variation in computational time with the number of points to approximately NlogN, by grouping the points to be integrated into boxes and performing with the help of multipole expansions the integral over these boxes. The integration is performed in terms of the tetrahedra, so that moments in the multipole expansion for a box are computed by integration over each tetrahedron in the box. The memory requirement for the relation of the tetrahedra to the box structure can be minimized by the use of a linked list.

The computational time is controlled by an integer L, where $2_L$ is the number of levels of box division to be made in step 22, by a limit , which is the maximum relative error allowed for an integration over a box (the smaller a value for , the further away from the field point a box must be), and by the number of terms kept in the multipole expansion.

Figure 4:
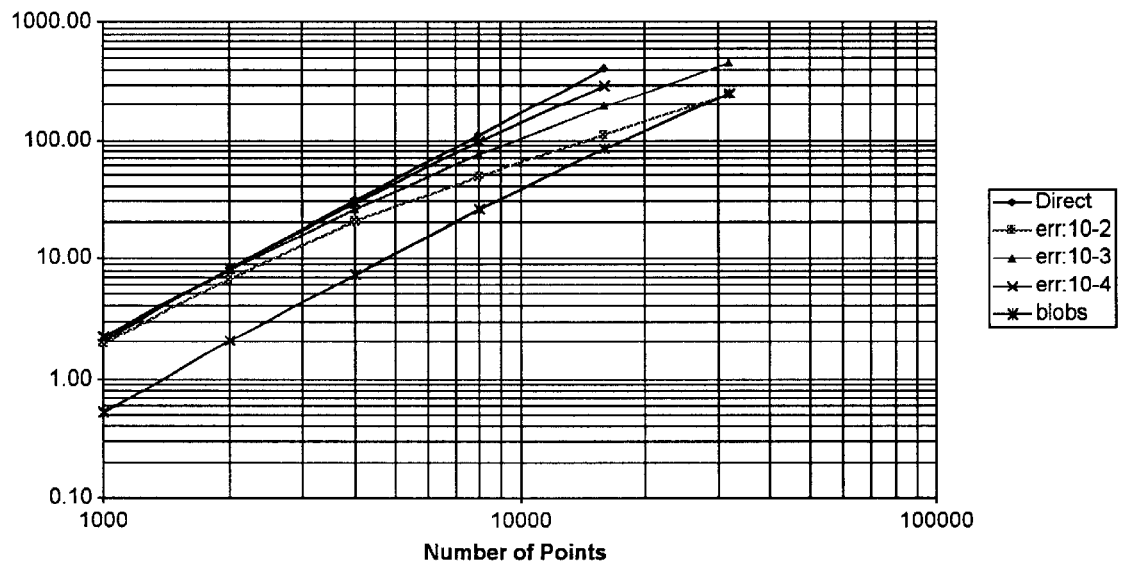
FIG. 4 is a graph showing the variation of cpu time with the number of points.
Figure 5:
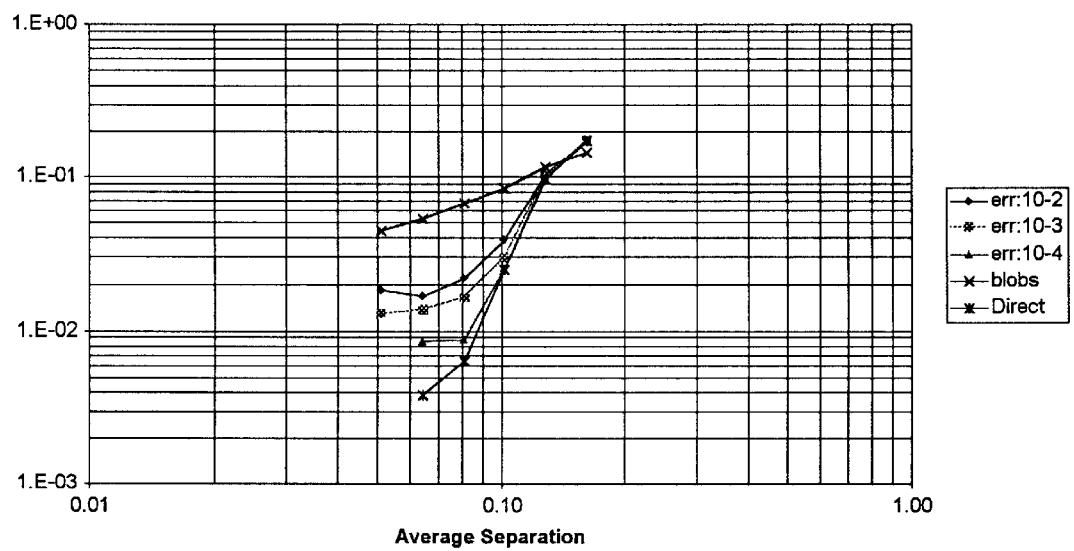
FIG. 5 is a graph showing the velocity calculation error using different calculating techniques, error factors and point separations.

FIG. 4 and 5 show results of tests of the Biot-Savart integration scheme (that is, tetrahedra with the accelerated calculation, after the tetrahedral mesh is constructed) for the spherical patch of vorticity known as Hill'vortex. The radius of the sphere is unity, and the points are placed randomly within the sphere. The number of points ranges from N 1000 to 32,000. The number of terms in the multipole expansion is fixed at 3 (through quadrapole). L is set to 11, and $=10_{-n}$, where n =2, 3, or 4. FIG. 4 shows the central processing unit (cpu) time for the velocity calculation on each point; also shown is the cpu time without the accelerated algorithm. The 'cross-over', the number of points above which the accelerated calculation is faster than the fully direct calculation, is below 2000 for all three values of n. The fully direct calculation increases with N as $N_{1.88}$, rather than $N_2$, reflecting the shorter time required for the 1-point quadrature than for the 5-point quadrature, and that more tetrahedra are integrated via the former rule as tetrahedra size decreases relative to distance to the field point. When N is so large that effectively all of the tetrahedra are integrated by the 1-point rule, the direct time will increase as $N^2$. As expected, the accelerated calculation contributes more for lower n, and by N =32,000 has approached a N log N increase with N.

FIG. 5 shows the $L_2$ error in the velocity calculation for Hill'vortex, for the three values of n, with, as above, the number of box levels set to L =11 and the number of terms in the multipole expansion set to 3. The error is plotted versus the average point separation distance, with again the number of points ranging from N =1000 to 32,000. For the smaller values of N (larger spacing), the error allowed in the accelerated calculation is not significant, since integration over most of the volume is performed with the direct expressions, so that the direct calculation contributes most of the error. On the other hand, for typical point separations below about 0.09 the error in the calculation is significantly affected by that allowed in the accelerated algorithm, with the minimum error limited by the error in the direct calculation.

Also included in FIG. 5 is the variation in the $L_2$ error with average point spacing when the velocity calculation is performed using the vortex blob method, as described above. Here L =11 again, and n =3. The error does not decrease nearly as rapidly with decreasing point spacing, as it does for the calculations via tetrahedra. This is in part due to the greater resolution provided by the tetrahedra (recall that the number of tetrahedra is slightly greater than six times the number of points). However, a significant contribution to the error appears to come from the fact that blobs associated with points near the outer boundary of the spherical vortex extend outside the nominal radius limit of the vorticity. This plot thus demonstrates the usefulness of tetrahedra for fitting the vorticity field in situations where the field abruptly (compared to the scale of the point spacing) ends. The vorticity field at the surface of a body is a relevant example.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for computing three dimensional unsteady flows about an object comprising the steps of:

establishing an allowable error for vorticity term calculations;

reading object geometry for providing points on a surface of an object;

establishing a region of interest about said object;

establishing a mesh incorporating said provided points;

setting initial flow conditions about said surface;

setting vorticity values at said provided points near said surface for satisfying boundary conditions;

establishing a new mesh incorporating the provided points and other points in said region of interest;

generating boxes including the provided points and other points;

calculating velocities and pressures at each point from the initial flow conditions, vorticity values and boundary conditions;

recording point positions, velocities, pressures and vorticity values for each point;

incrementing a time variable;

moving each point by applying the calculated velocity;

recalculating vorticity for each point; and iterating said method starting with said step of satisfying boundary conditions until said incremented time variable exceeds a predetermined time.

2. The method of claim 1 wherein said step of establishing a new mesh includes the step of forming tetrahedral elements including each said point.

3. The method of claim 2 wherein said step of forming tetrahedral elements about each said point comprises:

selecting a first point from said provided points closest to an origin;

selecting a second of said provided points closest to said first point;

selecting a third point from said provided points minimizing the radius of a circle including all three selected points;

establishing nearby points near all three selected points;

choosing a random other point from said nearby points in a positive normal direction to the plane containing said first, second and third points;

constructing a sphere from said first, second and third points and said random other point;

testing each nearby point to determine if said nearby point is within said constructed sphere until all nearby points have been tested;

replacing said other point with said tested nearby point if said tested nearby point is within said constructed sphere and reconstructing a sphere from said first, second and third points and said tested nearby point and continuing testing;

constructing additional tetrahedrons according to said steps of choosing an other nearby point, constructing a sphere, testing each nearby point and replacing said other nearby point, said constructing step using three said points on a side of a previously created tetrahedron; and continuing said step of constructing additional tetrahedrons until all said provided points and other points are incorporated in at least one tetrahedron.

4. The method of claim 2 wherein said step of calculating velocities and pressures at each point comprises the steps of:

calculating the contribution of tetrahedrons bordering the tetrahedron containing the point;

calculating the contribution of tetrahedrons within the box containing the point;

calculating the contribution of distant boxes; and combining the contributions of bordering tetrahedrons, tetrahedrons within the box and distant boxes for obtaining the velocity and pressure at the point.

5. The method of claim 4 wherein said step of calculating the contribution of tetrahedrons bordering the tetrahedron containing the point comprises utilizing analytic integration.

6. The method of claim 4 wherein said step of calculating the contribution of tetrahedrons within the box containing the point comprises utilizing the Gaussian quadrature five point rule.

7. The method of claim 4 wherein said step of calculating the contribution of distant boxes utilizing the Gaussian quadrature one point rule.

8. The method of claim 1 wherein said step of generating boxes includes the steps of:

calculating the total number of points from said allowable error for obtaining a minimum points for each box;

forming a box around all points of interest;

dividing each formed box along its longest dimension and forming two boxes, each box having substantially the same number of points therein; and continuing said step of dividing until all boxes have approximately the calculated minimum number of points therein.

* * * * *